(12) United States Patent
Kumar et al.

(10) Patent No.: US 12,130,754 B2
(45) Date of Patent: Oct. 29, 2024

(54) ADAPTIVE ROUTING FOR POOLED AND TIERED DATA ARCHITECTURES

(71) Applicant: Intel Corporation, Santa Clara, CA (US)

(72) Inventors: Karthik Kumar, Chandler, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 927 days.

(21) Appl. No.: 16/995,481

(22) Filed: Aug. 17, 2020

(65) Prior Publication Data

US 2020/0379922 A1    Dec. 3, 2020

(51) Int. Cl.
*G06F 12/14*     (2006.01)
*G06F 12/06*     (2006.01)
(Continued)

(52) U.S. Cl.
CPC ...... *G06F 12/1441* (2013.01); *G06F 12/0646* (2013.01); *G06F 12/0813* (2013.01); *G06F 12/0891* (2013.01); *G06F 12/1483* (2013.01)

(58) Field of Classification Search
CPC ............. G06F 12/1441; G06F 12/0646; G06F 12/0813; G06F 12/0819; G06F 12/1483
(Continued)

(56) References Cited

U.S. PATENT DOCUMENTS

| 6,370,614 B1 | 4/2002 | Teoman et al. |
| 2002/0007413 A1* | 1/2002 | Garcia-Luna-Aceves ................... H04L 61/45 709/229 |

(Continued)

FOREIGN PATENT DOCUMENTS

EP      1956491 B1      3/2012

OTHER PUBLICATIONS

International Search Report and Written Opinion for PCT Patent Application No. PCT/US21/42068, Mailed Nov. 1, 2021, 10 pages.
Freitas, Richard et al., "Solid-State Storage: Technology, Design and Applications", IBM Almaden Research Center, Feb. 2010, 64 pages.

(Continued)

*Primary Examiner* — Than Nguyen
(74) *Attorney, Agent, or Firm* — Essential Patents Group, LLP; Christopher K. Gagne (57) ABSTRACT

Examples described herein relate to a network device apparatus that includes a packet processing circuitry configured to determine if target data associated with a memory access request is stored in a different device than that identified in the memory access request and based on the target data associated with the memory access request identified as stored in a different device than that identified in the memory access request, cause transmission of the memory access request to the different device. In some examples, the memory access request comprises an identifier of a requester of the memory access request and the identifier comprises a Process Address Space identifier (PASID) and wherein the configuration that a redirection operation is permitted to be (Continued)

performed for a memory access request is based at least on the identifier. In some examples, the packet processing circuitry is to: based on configuration of a redirection operation not to be performed for the memory access request, cause transmission of the memory access request to a device identified in the memory access request.

20 Claims, 6 Drawing Sheets

(51) Int. Cl.
*G06F 12/0813* (2016.01)
*G06F 12/0891* (2016.01)

(58) Field of Classification Search
USPC .......................................................... 711/163
See application file for complete search history.

(56) References Cited

U.S. PATENT DOCUMENTS

| | | | |
|---|---|---|---|
| 2003/0002503 | A1 | 1/2003 | Brewer et al. |
| 2003/0191719 | A1* | 10/2003 | Ginter ....................... H04L 9/40 |
| | | | 375/E7.009 |
| 2008/0010409 | A1* | 1/2008 | Rao ....................... H04L 67/568 |
| | | | 711/118 |
| 2014/0325640 | A1 | 10/2014 | Aggarwal et al. |
| 2018/0088944 | A1* | 3/2018 | Subramanian ...... G06F 9/30047 |
| 2018/0188960 | A1 | 7/2018 | Pico |
| 2018/0365167 | A1* | 12/2018 | Eckert ................. G06F 12/1036 |
| 2019/0042144 | A1* | 2/2019 | Peterson ............... G06F 3/0635 |

OTHER PUBLICATIONS

Perriman, Symon, "How to Create and Manage Hot/Cold Tiered Storage", ALTARO, Part of Horentsecurity group, https://www.altaro.com/hyper-v/hot-cold-tiered-storage/, Sep. 19, 2019, 2 pages.

* cited by examiner

ADAPTIVE ROUTING FOR POOLED AND TIERED DATA ARCHITECTURES

Current server platforms have fairly self-contained compute, storage, and memory. However, self-contained compute, storage, and memory can lead to inefficiencies in usage at an application level and management at the infrastructure level. One of the current trends in data center architectures is disaggregation of resources from the server level to the data center level.

DETAILED DESCRIPTION

Some computing systems include a physical aggregation of compute, storage, and memory with shared power, shared cooling and rack management whereas some computing systems use communication fabrics and optical interconnects to communicatively couple computing modules of compute, storage, and memory to other modules with compute, storage, and memory for sharing of resources in computing modules. For example, some environments can include subsystem aggregation of input/output (IO), subsystem aggregation of compute, subsystem aggregation of pooled storage, subsystem aggregation of pooled memory, and shared boot.

Pooled memory infrastructures can include dual in-line memory modules (DIMMs) with volatile, non-volatile, or persistent memory devices that are accessible by compute resources or other pooled memory systems using a network or fabric. For pooled memory infrastructures, one of the challenges is that there is no "one size fits all" from a technology perspective. For example, 3D XPoint™-based persistent memory devices have very large capacities, can retain data even if the memory device loses power, but have much slower access characteristics (e.g., latency and bandwidth), whereas dynamic random-access memory (DRAM) has faster access characteristics, but lower capacities and higher cost. Memory tiering (e.g., memory mode or two level memory (2LM)) provides a faster memory tier (e.g., dynamic random-access memory (DRAM)) that can provide bandwidth and latency characteristics needed for frequently accessed "hot" data whereas a 3D XPoint™ based tier can be used for not-as-frequently data accessed "warm data" or even infrequently accessed "cold data."

Figure 1:
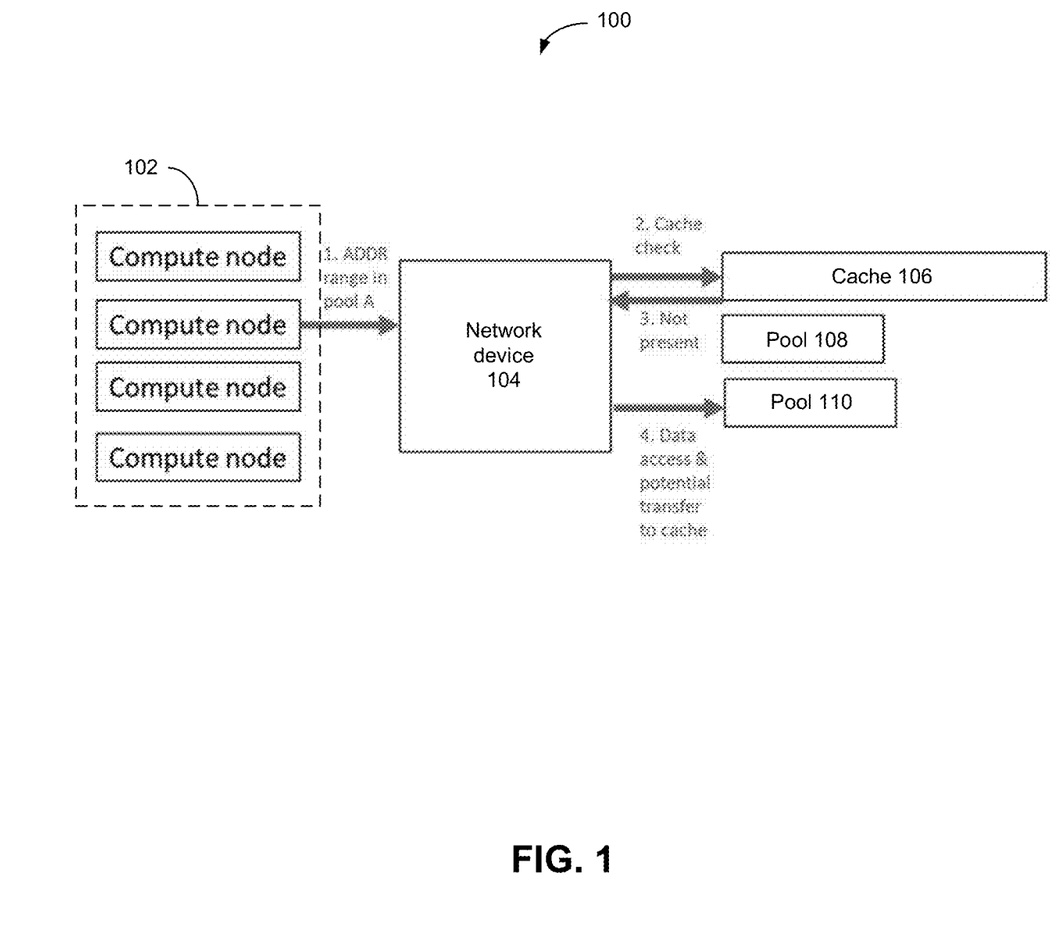
FIG. 1 depicts an example of an architecture.

FIG. 1 depicts an example of an architecture. For example, one or multiple compute nodes 102 (with integer N, N≥1, number of compute nodes) can be communicatively coupled to one or more memory pools 108 and 110 using network device 104 so that memory access requests (e.g., read or write) and responses thereto (e.g., acknowledgements of completed transactions or provided data) are composed in packets transmitted over a connection. Network device 104 or any network device can include one or more of: a network interface card, router, switch, bus interface, interconnect interface, transmitter endpoint, or receiver endpoint. In some examples, network device 104 can be a top of rack (TOR) or middle of rack (MOR) switch in a data center rack. For example, a connection can be any network, fabric, bus, or interconnect and the connection can be compatible at least with Intel® QuickPath Interconnect (QPI), Intel® Ultra Path Interconnect (UPI), Intel® On-Chip System Fabric (IOSF), Omnipath, Ethernet, InfiniBand, Compute Express Link (CXL), HyperTransport, high-speed fabric, PCIe, NVLink, Advanced Microcontroller Bus Architecture (AMBA) interconnect, OpenCAPI, Gen-Z, CCIX, NVMe, NVMe-oF, any network fabric that supports memory accesses using a memory transaction protocol, and so forth. See for example, NVMe-oF is described at least in NVM Express, Inc., "NVM Express Over Fabrics," Revision 1.0, Jun. 5, 2016, and variations and revisions thereof.

For example, pool 110 can store data for access by any of compute nodes 102. Pool 110 can include 3D XPoint™ (3DXP) memory technologies or other persistent or non-volatile memory technologies. Pool 110 can store data provided by a compute node 102 or other device. For data that is to be read or written at high bandwidth, high speeds, or low latency, a compute node 102 can utilize cache 106. Cache 106 can be allocated in a pool of DRAM or other volatile or non-volatile memory devices. In some examples, cache 106 can be allocated in a memory pool that includes pool 108. Cache 106 can provide a cache of a subset of data stored in pool 110. In some examples, when a compute node 102 is to access data from pool 110, network device 104 can check if cache 106 stores the data before requesting the data from pool 110. In some cases, cache 106 can store an up-to-date copy of the data in stored in pool 110 (e.g., more up-to-date than that stored in pool 110) or an outdated version of the data stored in pool 110 depending on how data coherence is managed.

An example operation is described next. At (1), to access data, network device 104 can send a request to cache 106 with an address (ADDR) range in pool 110. At (2), cache 106 can indicate if the requested data is stored in cache 106. At (3), based on a response from cache 106, if the data is not stored in cache 106 or is outdated, network device 104 can, at (4), send a request to pool 110 for the data. At (4), network device 104 can potentially copy the requested data from pool 110 to cache 106. In some examples, a round trip to request and receive a response from cache 106 can be tens of microseconds, and then additional time is spent to check pool 110 for the data. In cases where cache 106 is an associative cache, there may need to be several reads performed for tags in order to determine data presence in cache 106. Some embodiments can check cache 106 and pool 110 for data concurrently, compare the two results, and if different, network device 104 can provide data from cache 106 to a compute node 102 through one or more network devices.

Use of network protocols to follow through a series of checks in cache 106 and pool 110, and coordinate cache management between the pools can overload a system. Providing concurrent requests to different memory device for several thousands of requests from tens of compute nodes to tens of memory pools and caches at the switch level using software defined ranges for cache and pool configurations may introduce excessive traffic on the connection or over-utilize resources for memory access operations and not scale acceptably.

Various embodiments provide for a network device (e.g., switch) to identify which address ranges of a storage or memory pool are also cached in a cache of a memory pool. For example, a network device can maintain a directory to identify address ranges in a storage or memory pool that are also cached in a cache of a memory pool. A tag presence directory stored in the network device can be accessed to determine which memory pool, if any, is to receive a request for data access. Based on the tag presence directory, the network device can redirect a memory request precisely to the memory pool device that stores the latest copy of the data instead of querying the cache and, in an event of a miss in the cache, also request data from the pool. Various embodiments provide an interface to an administrator, application software, a hypervisor, or other software to program the network device with a range of addresses in the memory subsystem.

Figure 2:
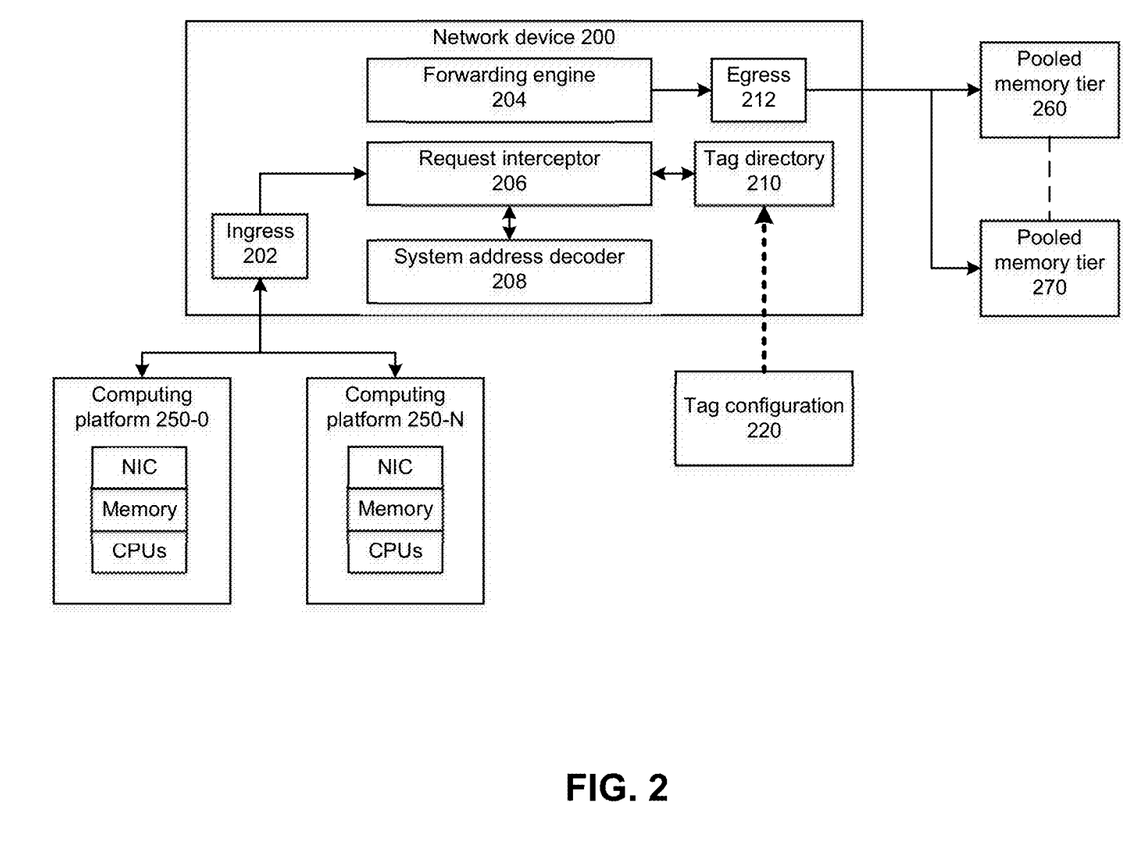
FIG. 2 depicts a high-level block diagram of a system.

FIG. 2 depicts a high-level block diagram of various embodiments. In this system, any of computing platforms 250-0 to 250-N (N is an integer and N≥1) can issue read or write requests to any of pooled memory tiers 260 to 270 on behalf of devices or application or other software executed on CPUs. For example, any computing platforms 250-0 to 250-N can include CPUs, cores, GPUs, accelerators, memory, storage, and interface devices (e.g., NICs, fabric interface, bus interface, or interconnect interface). Any computing platforms 250-0 to 250-N can execute a container or virtual machine that requests a write or read of data. Although two pooled memory tiers are shown, any number of pooled memory tiers or devices can be used.

In some examples, pooled memory tier 260 can include memory device technology that provides for faster access of data than that of pooled memory tier 270 with respect to computing platforms 250-0 to 250-N. For example, pooled memory tier 260 can include DRAM, SRAM, or other memory device technology whereas pooled memory tier 270 can include persistent memory (e.g., 3D XPoint™) or nonvolatile memory (e.g., NAND). In some examples, pooled memory tier 260 can be physically situated (e.g., closer distance through a network medium) to network device 200 than pooled memory tier 270. Pooled memory tier 260 can be located in a same datacenter as that of network device 200 or a datacenter closer in physical distance than that of pooled memory tier 270 with respect to network device 200. In some examples, pooled memory tier 260 can be accessible through a higher speed network medium than that of pooled memory tier 270. In some examples, memory tiers 260 are attached directly to network device 200 instead of a memory rack and can use connections such as DDR or CXL to support at least memory transaction requests from any computing platform 250-0 to 250-N.

Various embodiments can use at least two levels of memory ("2LM") whereby memory tier 260 is a nearer memory than memory tier 270. By use of 2LM, data can be moved to near memory when it is closer to being needed for processing data or content. Copying content from far memory to near memory can reduce latency of availability of content. 2LM can include cached subsets of system disk or SSD-level storage (in addition to, for example, run-time data). This main memory can include a first level (alternatively referred to herein as "near memory") including smaller faster memory made of, for example, DRAM or other volatile memory (e.g., cache); and a second level (alternatively referred to herein as "far memory") which includes larger and slower (with respect to the near memory) volatile memory (e.g., DRAM, cache) or nonvolatile memory storage (e.g., flash memory or byte addressable non-volatile memory). The far memory can be presented as "main memory" to the host operating system (OS), while the near memory can act as a cache for the far memory that is transparent to the OS. Management of the two-level memory may be done by a combination of logic and modules executed via the host central processing unit (CPU). Near memory may be coupled to the host system CPU via high bandwidth, low latency interfaces for efficient processing. Far memory may be coupled to the CPU via low bandwidth, high latency interface (as compared to that of the near memory).

A memory request received at ingress 202 of network device can be forwarded to request interceptor 206. For example, the memory request can be packaged as a part of a remote direct memory access (RDMA) request. RDMA is described at least in RFC 5040 (2007) and RFC 7306 (2014) and variations and derivatives thereof. For example, request interceptor 206 can intercept or receive RDMA requests targeting a remote pooled memory architecture (in the example, pooled memory tier 270 (Tier 2) being cached by pooled memory tier 260 (Tier 1 or caching tier)). Various versions of RDMA can be used including but not limited to RDMA over Converged Ethernet (RoCE), InfiniBand, Omni-Path, and iWARP. Embodiments are described in the context of RDMA, but approaches can be applied to Ethernet (IEEE 802.3-2018 and any earlier or later versions or variations thereof) or other protocols.

In some examples, system address decoder (SAD) 208 can configure request interceptor 206 to intercept or not intercept memory access requests from particular computing platform requesters or memory address ranges and redirect memory access requests to a destination. For example, a memory access request can include a tenant identifier (e.g., Process Address Space ID (PASID)). SAD 208 can be configured to identify which PASID or requester can or use request interceptor 206 to identify whether a memory access request is to be targeted to a memory tier 260 or tier 270. For example, an administrator, hypervisor, orchestrator, or other software or hardware can enable or disable use of request interceptor 206 for one or more requesters or PASIDs, or regardless of requester or PASID. For example, certain customers with particular PASIDs may have paid for use of request interceptor 206 and those PASIDs are permitted to use request interceptor 206 to intercept or not intercept memory access requests from particular computing platform requesters and redirect memory access requests to a destination. For example, certain memory transactions for particular PASIDs are latency sensitive and those PASIDs are permitted to use request interceptor 206 to intercept or not intercept memory access requests from particular computing platform requesters and redirect memory access requests to a destination.

For example, a format of permissions for use of request interceptor 206 as well as criteria for application of various actions can be as follows.

| Requester identifier | Memory range | Permission | Criteria |
| --- | --- | --- | --- |
| PASID_0 | Any | Yes to tier 1 Yes to tier 2 | |
| PASID_1 + BVD | Just 0000 to 1000 | Yes to tier 1 No to tier 2 | If_Bandwidth_1> threshold1 do X else do Y |

An example of applied criteria can be if there is an option to obtain a same copy of data from two possible locations (e.g., caching or cached tier or two replicas), network device 200 could apply criteria to decide which location to select based on run time conditions such as available bandwidth. If a device that stores a copy of data in a location has a bandwidth saturation or congestion, then another device that stores a copy of the data in another location can be chosen to access the data.

An administrator, hypervisor, orchestrator, or other software or hardware can enable or disable SAD 208 to apply a check of whether a redirection operation is to take place. An example tag caching rule can be defined as follows.

| Name | Example description |
|---|---|
| Caching tier ID | This can be an IP, MAC or any other type of ID depending on the network. In this example, tier 260 is a caching tier. |
| Cached tier ID | This can be an IP, MAC or any other type of ID depending on the network. In this example, tier 270 is a cached tier. |
| Memory range | Memory range where a tag caching rule will be implemented. |
| Policy applied to that memory range. | 1) Intercept and access tag cache for the memory region.<br>2) Do not intercept requests for that memory region (hence no access to tag directory 210).<br>3) Send victim data and read request parallel to Tier 1 and Tier 2 when a miss for the caching tier is identified.<br>4) Remove or update any of the registered rules. |
| Permitted updaters | Interface to potentially specify what entity can update or create rules. Network device 200 may have configurations that allow to specify that only specific entities (such as software stack on particular node with a particular certificate) can register of update rules for a particular set of caching and cached tiers. |

Request interceptor 206 can be configured to receive or intercept memory transaction requests (e.g., RDMA requests) and determine if the memory transaction is to a target pooled memory architecture (e.g., pooled memory tier 260 (cache tier) and pooled memory tier 270). Request interceptor 206 can determine whether the data being addressed is hosted or not into pooled memory tier 260. For example, if a memory transaction is directed to pooled memory tier 270, based on tag directory 210 indicating that data is stored in pooled memory tier 260, request interceptor 206 can direct the memory transaction to pooled memory tier 260. As another example, if a memory transaction is directed to pooled memory tier 260, based on an entry in tag directory 210 indicating that a target data or memory address is stored in pooled memory tier 270, request interceptor 206 can redirect the memory transaction to pooled memory tier 270 instead of sending the request to pooled memory tier 260 despite the request being addressed to pooled memory tier 260. For example, request interceptor 206 can include a memory controller to generate and issue commands to a memory device that is attached through any type of connection. Accordingly, network device 200 may not "guess" that data is stored in pooled memory tier 260 and, in an event that pooled memory tier 260 does not store requested data, incur another memory transaction to memory tier 270 (and associated network or fabric traffic) or vice versa.

A memory transaction can include a destination IP address and memory address. The destination IP address in a memory transaction can be used to select a group of tags for use by system address decoder (SAD) 208 to search for whether the memory address is cached in a tier 1 device (e.g., pooled memory tier 260) associated with the memory address or another tier. In some examples, where multiple groups of Tier 1 devices are used, each different group of Tier 1 devices can be identified by a different destination IP addresses. For example, if pooled memory tier 260 (Tier 1 cache) includes multiple devices with different destination IP addresses, a destination IP address can be used to identify a specific device among Tier 1. Addresses other than IP addresses can be used such as MAC addresses, or other addresses. In some examples, object names can be used as identifiers that are looked up to determine the destination IP address. For example, find "record 'employment history' of Empl_ID 11335976" causes the ID 11335976 to be looked up to determine which machine hosts the required data.

Various embodiments provide for configuring different memory ranges for each tier of memory. An administrator, hypervisor, orchestrator, or other software or hardware can enable or disable network device 200 from performing tag caching for a memory region and intercept requests made to that memory region for particular requesters or to not intercept requests for that memory region and allow the memory transaction to be sent to a destination specified by a requester. In cases where network device 200 is configured to not perform tag caching for a memory region and intercept requests made to that memory region for particular requesters, tag caching in tag directory 210 may not be performed. An administrator, hypervisor, orchestrator, or other software or hardware can enable or disable network device 200, when a miss for the caching tier 260 is identified, to (1) read the requested data from tier 270, (2) evict data from pooled memory tier 260, (3) store the evicted data into tier 270, and (4) store the requested data from tier 270 into tier 260, where (1) to (4) can occur in parallel, partially-in-parallel, or sequentially.

In some examples, a tag in tag directory can include one or more of the following fields.

| Field | Example description |
|---|---|
| Destination IP address (optional) | A device address that identifies a memory device. |
| Caching Tier ID | An identifier of a tier of a cache such as Tier 1, Tier 2, and so forth. For example, a latency to access data in Tier 1 can be higher than a latency to access data in Tier 2 and so forth. |
| Cache Tier ID | An identifier of a device in a cache tier. For example, multiple different memory devices in a tier can be distinguished using this field. |
| Memory address TAG | A starting memory address associated with the tag. |
| Access frequency | Level of access frequency to the address. More frequently accessed data from an address may be less likely to be evicted from a tier to a lower tier (higher numbered tier). Less frequently accessed data from an address may be more likely to be evicted from a tier to a lower tier (higher numbered tier). |

In some examples, memory tier 260 can include tags for all data stored in memory tier 260 and some tags can also be stored in tag directory 210. In some examples, tags could just be in tag directory 210 with no other copy of tags in memory tier 260. Memory tier 260 can cause an update of tags in tag director 210 based on changes to content stored in memory tier 260.

For example, tag configuration 220 can provide an update of tags corresponding to data stored in pooled memory tier 260 or another pooled memory tier. For example, in an event of an eviction from pooled memory tier 260, a tag can be updated in tag directory 210 to indicate data associated with an evicted address is stored outside of tier 260 (e.g., tier 270 or another tier). For example, in an event of addition of data associated with an address to pooled memory tier 260 (e.g., an upgrade in caching tier), a tag can be updated in tag directory 210 to indicate data associated with the address is stored in tier 260. In some examples, at or before an update occurs to content stored in tier 260, a tag is added or updated so that tag directory 210 stores an accurate representation of cached data addresses in tier 260. In some examples, any request to a particular address corresponding to an address that is being updated in tier 260 can be held by request interceptor 206 and released after an acknowledgement is received from tier 260 that data associated with the particular address has been stored in tier 260 so that any access request to tier 260 accesses data at the requested address.

An administrator, hypervisor, orchestrator, or other software or hardware can enable or disable network device 200 to update tags in tag director 210. Tags in tag director 210 can be updated at time intervals or depending on the network bandwidth. An interface can allow one or more caching tiers to notify network device 200 when tags are updated in tier 260 or other tiers using tag configuration 220 received by network device 200.

In some examples, tag directory 210 may use a small amount of memory and a bloom filter can be used to indicate whether a range of memory addresses are stored or not stored in tier 260. For example, tag directory 210 can include a bloom filter that indicate a possibility of whether a 10 GB (gigabyte) (or other sized) range of memory address are stored in tier 260. If the bloom filter indicates there is no possibility a data address is stored in memory tier 260, pooled memory tier 270 or another tier stores the data. In an event of an update of addresses corresponding to cached data in pooled memory tier 260, the bloom filter can be updated. Note that addresses can be virtual addresses or physical addresses or other memory address representations. Tag directory 210 can indicate which devices and tiers store data for a range of addresses and not just a cache tier (e.g., tier 260).

In some examples, network device 200 can detect a pattern of memory accesses and cause a pre-fetch of data from tier 270 to tier 260 or tier 260 to a local memory device prior to computing platform 250 issuing a receipt of a memory request for such pre-fetched data. For example, the local memory device can be part of a computing platform 250 or locally connected to a computing platform 250 or network device 200 using a connection such as PCIe, DDRx (where x is an integer), or CXL.

Various embodiments of network device 200 can handle reconfigurability in the caching tiers. For example, pool A may act as a cache for pool B originally but pool A can become a cache for pool C. In some examples, pool A case be split into two sub-pools, where a first sub-pool is cache for pool B and a second sub-pool is a cache for pool C. Network device 200 can update tag directory 210 to identify cached content and for which pool.

Figure 3:
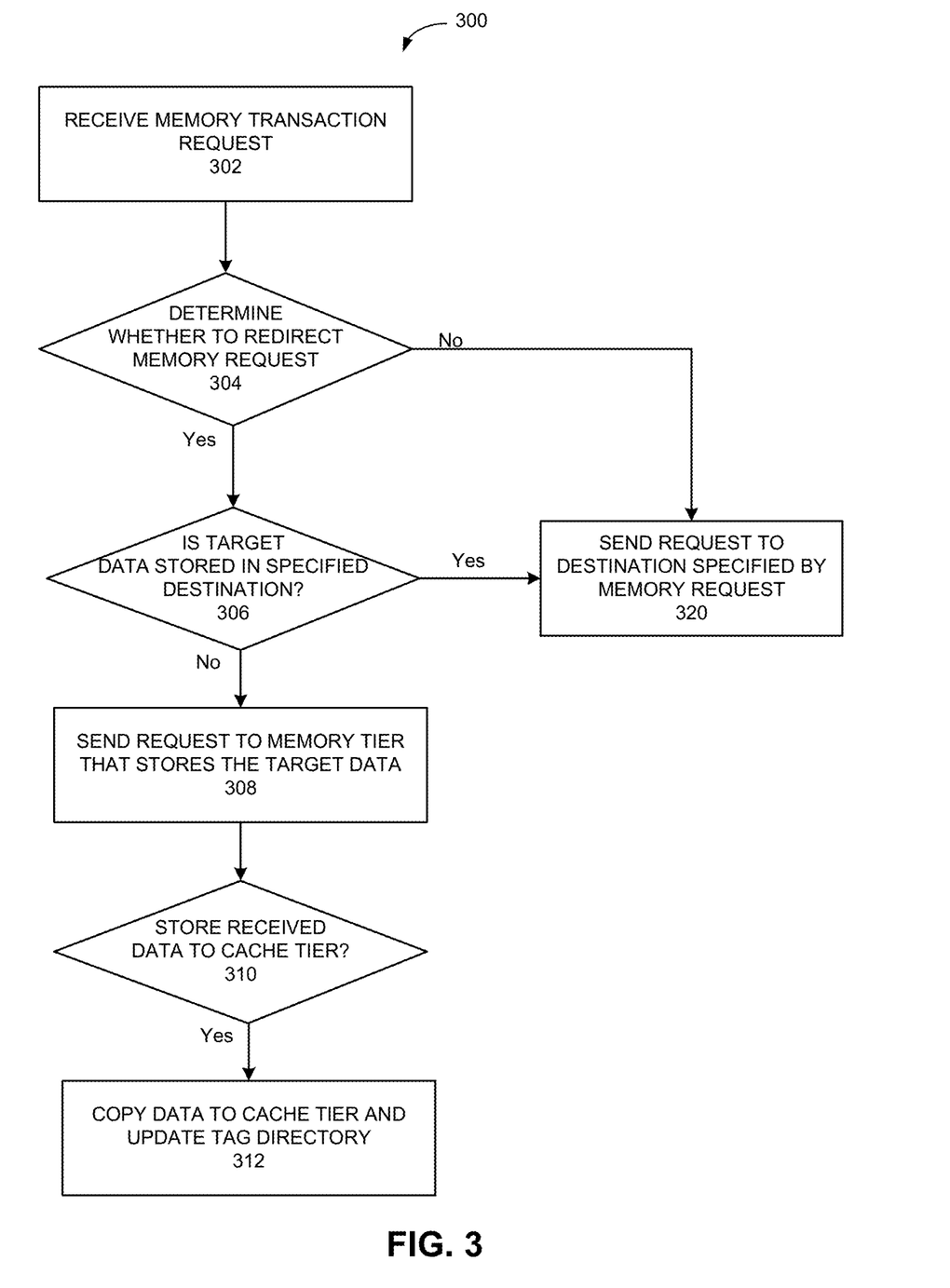
FIG. 3 depicts an example process.

FIG. 3 depicts an example process. In process 300, at 302, a network device can receive a memory access request or memory transaction. The memory access request or memory transaction can include a read or write request. For example, a memory transaction can indicate a requester identifier (e.g., PASID), memory address and a destination device address. At 304, the network device can determine whether to redirect the memory request to a different destination device than indicated in the request. For example, the network device can determine whether apply to a tag inspection rule for the memory transaction based on a configuration of the network device to apply tag inspection or memory request redirection based on requester identifier or target address. For example, the network device can determine whether to apply a tag inspection rule for the memory transaction based on the PASID of the requester. A tag inspection rule can be applied that can include: (1) intercept and access tag cache for the memory region; (2) do not intercept requests for that memory region; or (3) send victim data and read request parallel to Tier 1 and Tier 2 when a miss for the caching tier is identified. The network device can be configured with a tag directory for a pair of at least two tiers (e.g., caching and cached tiers). A tag directory can be applied for a pair of two tiers (caching and cached tiers) or more tiers.

At 304, if a determination of a redirection request is permitted for the requester, the process proceeds to 306. At 306, the network device can determine whether the target data that is requested in the memory request is stored in a destination address specified in the memory request. For example, the network device can determine whether the memory address associated with the memory request corresponds with data cached in a Tier 1 memory cache or another memory tier. If the memory address associated with the memory request corresponds with data cached in a Tier 1 memory, then the process continues to 308. If the memory address associated with the memory request does not correspond with data cached in a Tier 1 memory, then the process can continue to 320.

At 308, the network can issue a memory access request to the memory tier that stores the data that is subject to the memory request. For example, if according to a tag directory, the memory request is directed to a Tier 2 but the data is stored in a cache tier (e.g., Tier 1), the request can be sent to the device of the cache tier that stores the data in Tier 1. For example, if according to a tag directory, the memory request is directed to a Tier 1 but the data is stored in a cache tier (e.g., Tier 2), the request can be sent to the device of the cache tier that stores the data in Tier 2. Subsequently, retrieved data can be received at the network device.

At 310, the network device can determine whether to store the retrieved data in a cache tier of memory. For example, if the retrieved data is not to be stored into a cache tier, then the process 300 can end. For example, if the retrieved data is not stored in a Tier 1 memory, the network device can determine to store the retrieved data in the Tier 1 memory. However, storing retrieved data in the Tier 1 memory can require a cache entry eviction of data in the Tier 1 memory as described herein and the evicted data can be stored to another Tier 1 memory or another tier of memory. At 312, if data is copied to Tier 1 memory, the tag directory for the Tier 1 memory can be updated to indicate that data associated with a particular address is cached in a Tier 1 memory. If data is evicted from Tier 1 memory to another Tier 1 memory or another tier of memory, the tag directory is updated.

Referring back to 306, in an event redirection is not to be performed, at 320, the network device can issue a memory access request to the destination memory device specified in the memory access request.

Figure 4:
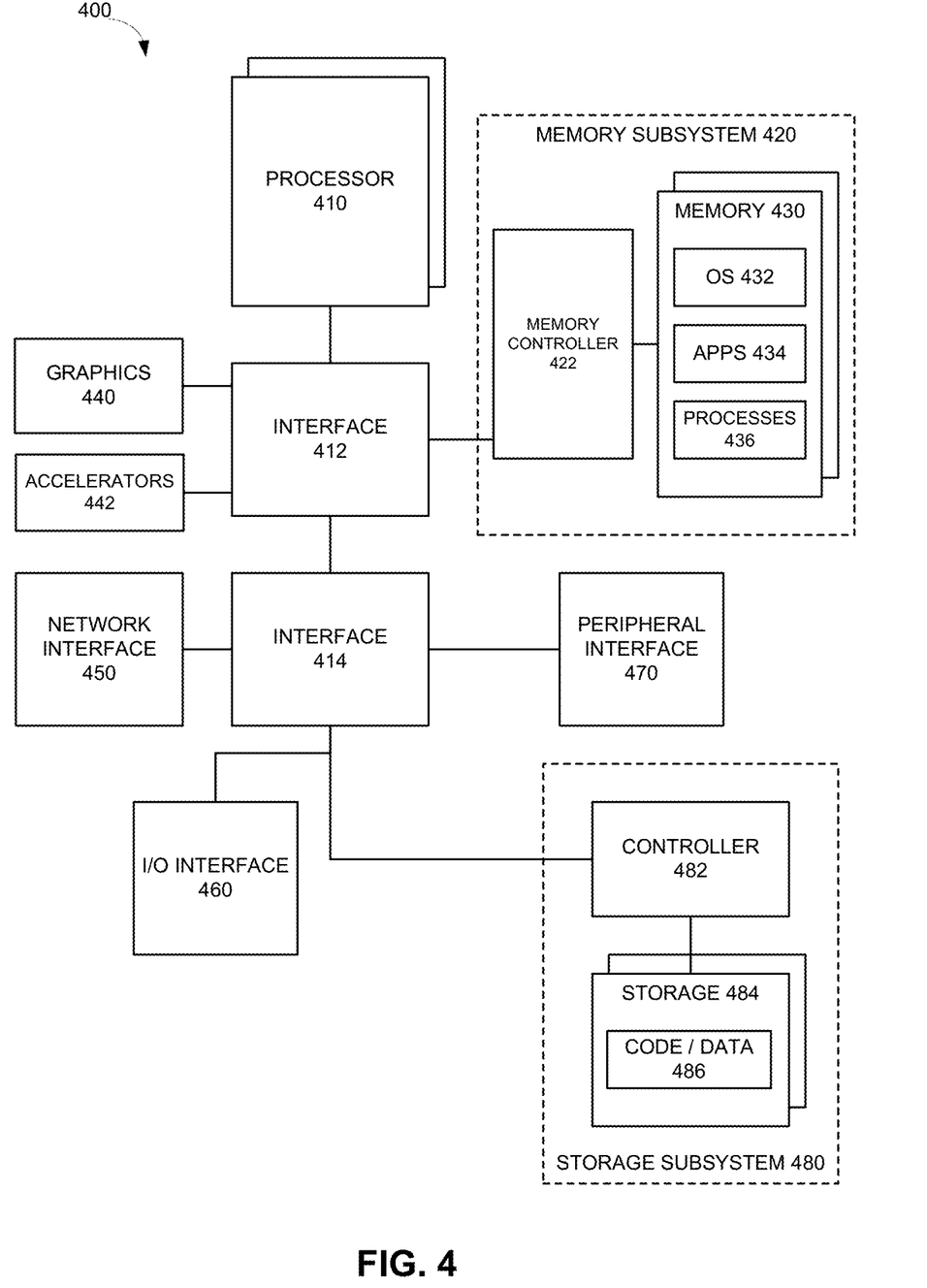
FIG. 4 depicts a system.

FIG. 4 depicts a system. Various embodiments can be used by system 400 to request data from a memory device and use a network device to redirect the request as well as other embodiments described herein. System 400 includes processor 410, which provides processing, operation management, and execution of instructions for system 400. Processor 410 can include any type of microprocessor, central processing unit (CPU), graphics processing unit (GPU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 400 includes interface 412 coupled to processor 410, which can represent a higher speed interface or a high throughput interface for system components that needs higher bandwidth connections, such as memory subsystem 420 or graphics interface 440, or accelerators 442. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 1120p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Accelerators 442 can be a programmable or fixed function offload engine that can be accessed or used by a processor 410. For example, an accelerator among accelerators 442 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 442 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 400 includes interface 414, which can be coupled to interface 412. In one example, interface 414 represents an interface circuit, which can include stand-alone components and integrated circuitry. In one example, multiple user interface components or peripheral components, or both, couple to interface 414. Network interface 450 provides system 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 450 can receive data from a remote device, which can include storing received data into memory. Various embodiments can be used in connection with network interface 450, processor 410, and memory subsystem 420.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a nonvolatile manner, such as one or more magnetic, solid state, or optical based disks, or a combination. Storage 484 holds code or instructions and data 1046 in a persistent state (e.g., the value is retained despite interruption of power to system 400). Storage 484 can be generically considered to be a "memory," although memory 430 is typically the executing or operating memory to provide instructions to processor 410. Whereas storage 484 is nonvolatile, memory 430 can include volatile memory (e.g., the value or state of the data is indeterminate if power is interrupted to system 400). In one example, storage subsystem 480 includes controller 482 to interface with storage 484. In one example controller 482 is a physical part of interface 414 or processor 410 or can include circuits or logic in both processor 410 and interface 414.

A volatile memory is memory whose state (and therefore the data stored in it) is indeterminate if power is interrupted to the device. Dynamic volatile memory can involve refreshing the data stored in the device to maintain state. An example of a volatile memory includes a cache. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 400 can be implemented using interconnected compute sleds of processors, memories, storages, network interfaces, and other components. High speed interconnects can be used such as: Ethernet (IEEE 802.3), remote direct memory access (RDMA), InfiniB and, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 5:
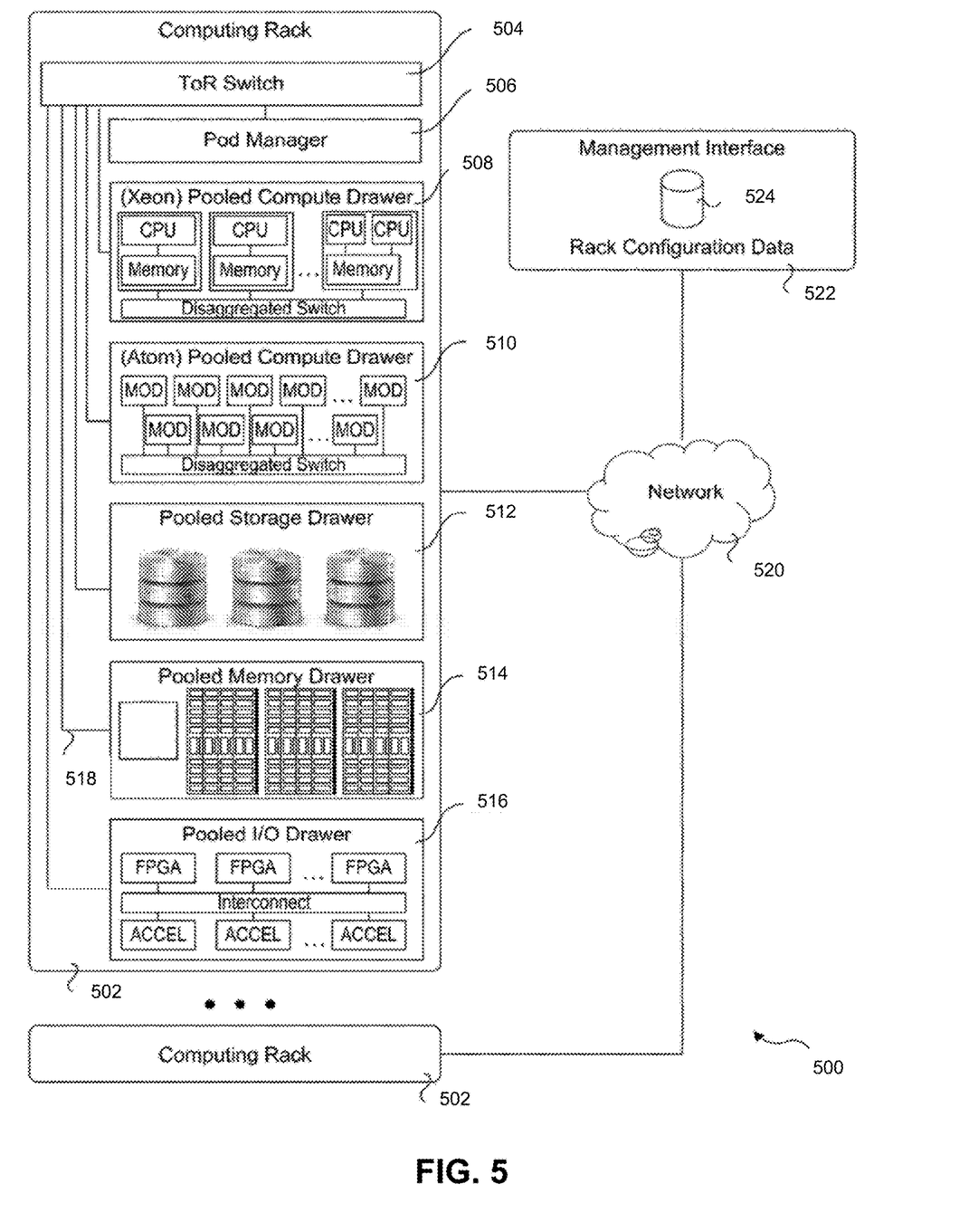
FIG. 5 depicts an example environment.

FIG. 5 depicts an environment 500 includes multiple computing racks 502, one or more including a Top of Rack (ToR) switch 504, a pod manager 506, and a plurality of pooled system drawers. Various embodiments can be used in the environment 500 to request data from a memory device and use a network device to redirect the request as well as other embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 508, and Intel® ATOM™ pooled compute drawer 510, a pooled storage drawer 512, a pooled memory drawer 514, and a pooled I/O drawer 516. Any of the pooled system drawers is connected to ToR switch 504 via a high-speed link 518, such as a 40 Gigabit/second (Gb/s) or 100 Gb/s Ethernet link or a 100+Gb/s Silicon Photonics (SiPh) optical link, or higher speeds.

Multiple of the computing racks 502 may be interconnected via their ToR switches 504 (e.g., to a pod-level switch or data center switch), as illustrated by connections to a network 520. In some embodiments, groups of computing racks 502 are managed as separate pods via pod manager(s) 506. In one embodiment, a single pod manager is used to manage all of the racks in the pod. Alternatively, distributed pod managers may be used for pod management operations.

Environment 500 further includes a management interface 522 that is used to manage various aspects of the environment. This includes managing rack configuration, with corresponding parameters stored as rack configuration data 524.

Figure 6:
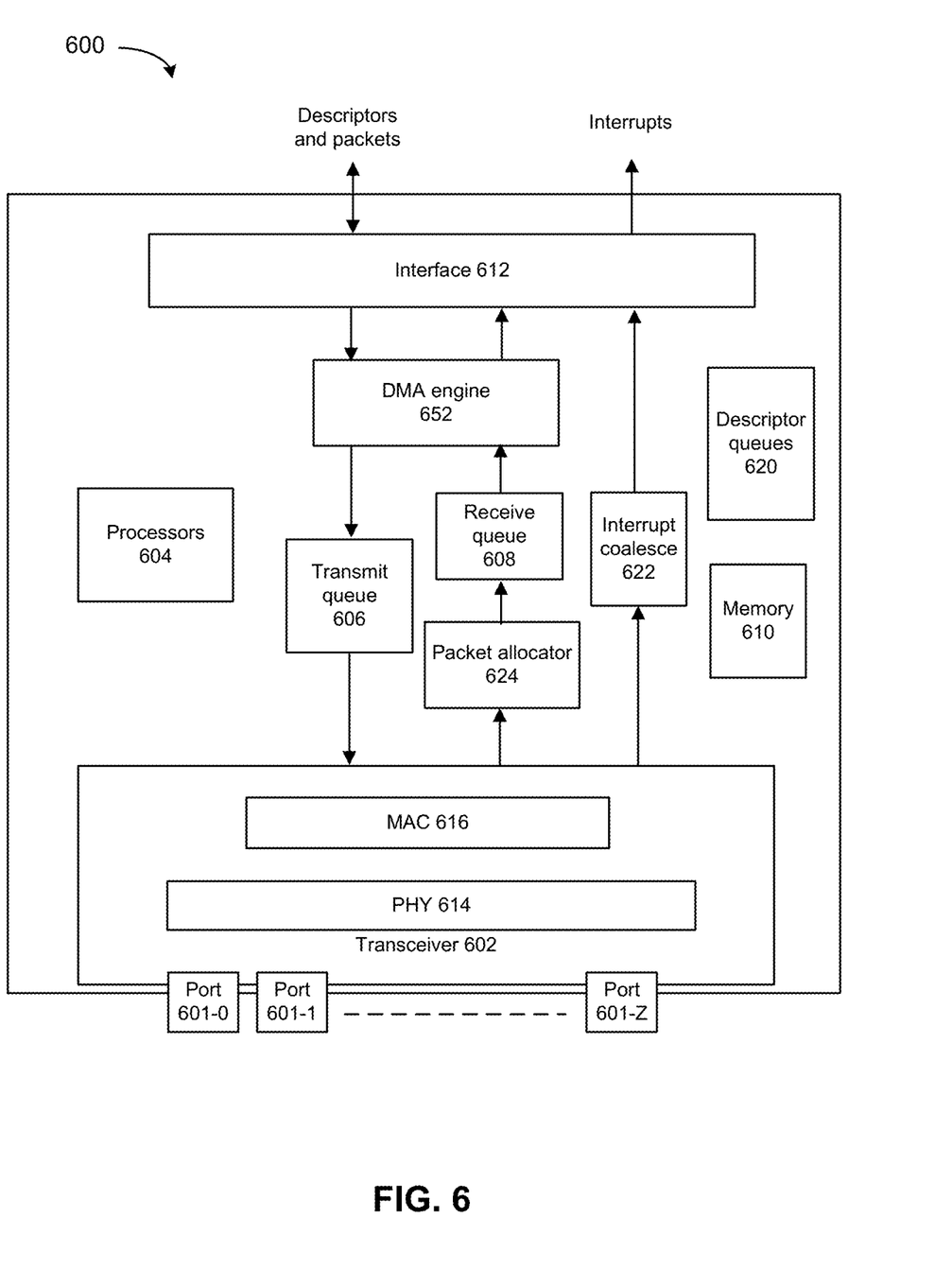
FIG. 6 depicts an example network interface.

FIG. 6 depicts an example of a network interface. Various embodiments of the network interface can perform embodiments described herein with respect to redirection of memory access requests. Transceiver 602 can be capable of receiving and transmitting packets using various ports 601-0 to 601-Z in conformance with the applicable protocols such as Ethernet as described in IEEE 802.3, although other protocols may be used. Transceiver 602 can receive and transmit packets from and to a network via a network medium (not depicted). A network medium can be a wired or wireless medium. A wired medium can conduct electrical and/or optical signals. For example, a medium can be any type of cable such as but not limited to optical fiber (e.g., 25GBASE-SX, 25GBASE-LX, 1000BASE-X, 1000BASE-SX, 1000BASE-LX, 1000BASE-BX, 1000BASE-RHx, or 1000BASE-PX), twisted pair cable (e.g., 1000BASE-T, 1000BASE-T1, 1000BASE-TX), shielded balanced copper cable (e.g., 1000BASE-CX), copper backplane (e.g., 1000BASE-KX), as well as other speeds (e.g., 10G).

Transceiver 602 can include PHY circuitry 614 and media access control (MAC) circuitry 616. PHY circuitry 614 can include encoding and decoding circuitry (not shown) to encode and decode data packets according to applicable physical layer specifications or standards. MAC circuitry 616 can be configured to assemble data to be transmitted into packets, that include destination and source addresses along with network control information and error detection hash values.

Processors 604 and packet processing circuitry can include any combination of a: processor, core, graphics processing unit (GPU), field programmable gate array (FPGA), application specific integrated circuit (ASIC), or other programmable hardware device that allow programming of network interface 600. For example, processors 604 can provide for identification of a resource to use to perform a workload and generation of a bitstream for execution on the selected resource. For example, a "smart network interface" can provide packet processing capabilities in the network interface using processors 604.

Packet allocator 624 can provide distribution of received packets for processing by multiple CPUs or cores using timeslot allocation described herein or RSS. When packet allocator 624 uses RSS, packet allocator 624 can calculate a hash or make another determination based on contents of a received packet to determine which CPU or core is to process a packet.

Interrupt coalesce 622 can perform interrupt moderation whereby network interface interrupt coalesce 622 waits for multiple packets to arrive, or for a time-out to expire, before generating an interrupt to host system to process received packet(s). Receive Segment Coalescing (RSC) can be performed by network interface 600 whereby portions of incoming packets are combined into segments of a packet. Network interface 600 provides this coalesced packet to an application.

Direct memory access (DMA) engine 652 can copy a packet header, packet payload, and/or descriptor directly from host memory to the network interface or vice versa, instead of copying the packet to an intermediate buffer at the host and then using another copy operation from the intermediate buffer to the destination buffer.

Memory 610 can be any type of volatile or non-volatile memory device and can store any queue or instructions used to program network interface 600. Transmit queue 606 can include data or references to data for transmission by network interface. Receive queue 608 can include data or references to data that was received by network interface from a network. Descriptor queues 620 can include descriptors that reference data or packets in transmit queue 606 or receive queue 608. Bus interface 612 can provide an interface with host device (not depicted). For example, bus interface 612 can be compatible with PCI, PCI Express, PCI-x, Serial ATA, and/or USB compatible interface (although other interconnection standards may be used).

In some examples, processors 604 can perform one or more of: large receive offload (LRO), large send/segmentation offload (LSO), TCP segmentation offload (TSO), Transport Layer Security (TLS) offload, receive side scaling (RSS) to allocate a queue or core to process a payload. LRO can refer to reassembling incoming network packets and transfer packet contents (e.g., payloads) into larger contents and transferring the resulting larger contents but fewer packets for access by the host system or a virtualized execution environment.

LSO can refer to generating a multipacket buffer and providing content of the buffer for transmission. A host device can build a larger TCP message (or other transport layer) (e.g., 64 KB in length) and processors 604 can segment the message it into smaller data packets for transmission. TLS is defined at least in The Transport Layer Security (TLS) Protocol Version 1.3, RFC 8446 (August 2018). TLS offload can refer to offload of encryption or decryption of contents in accordance with TLS in processors 604. Network interface 600 can receive data for encryption and perform the encryption of data prior to transmission of encrypted data in one or more packets. Network interface 600 can receive packets and decrypt content of packets prior to transfer of decrypted data to a host system. In some examples, any type of encryption or decryption be performed such as but not limited to Secure Sockets Layer (SSL).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a method comprising: in a switch: receiving a memory access request from a requester and based on a configuration that a redirection operation is permitted to be performed for the memory access request: determining if target data associated with the memory access request is stored in a different device than that identified in the memory access request and based on the target data associated with the memory access request determined to be stored in a different device than that identified in the memory access request, causing transmission of the memory access request to the different device.

Example 2 includes any example, wherein the memory access request includes an identifier of the requester and the identifier comprises a Process Address Space identifier (PASID).

Example 3 includes any example, wherein configuration that a redirection operation is permitted to be performed for the memory access request is based at least on the identifier.

Example 4 includes any example, and includes: in the switch: based on a configuration that a redirection operation is not permitted to be performed for the memory access request, causing transmission of the memory access request to a device identified by the memory access request.

Example 5 includes any example, and includes: in the switch: based on a configuration that a redirection operation is permitted to be performed for the memory access request: accessing a directory of cached content in a memory cache tier to determine whether the target data associated with the memory access request is stored in a different device than that identified in the memory access request, wherein the directory is stored in the switch.

Example 6 includes any example, wherein the directory of cached content in a memory cache tier comprises at least one entry that indicates whether data associated with an addressable region is stored in the memory cache tier or another memory tier.

Example 7 includes any example, wherein the directory of cached content in a memory cache tier comprises at least one entry that indicates which addressable device stores data associated with an addressable region.

Example 8 includes any example, and includes: in the switch: receiving target data from a device in a non-memory cache tier; copying the target data to a device in a memory cache tier; and updating a directory of cached content in the memory cache tier to: (a) identify the target data as stored in a device in the memory cache tier and (b) a destination for any data evicted from a device in the memory cache tier.

Example 9 includes any example, and includes a non-tangible computer-readable medium comprising instructions stored thereon, that if executed by one or more processors, cause the one or more processors to: configure a network device to: based on a configuration that a redirection operation is permitted to be performed for a memory access request: determine if target data associated with the memory access request is stored in a different device than that identified in the memory access request and based on the target data associated with the memory access request identified as stored in a different device than that identified in the memory access request, cause transmission of the memory access request to the different device.

Example 10 includes any example, wherein the memory access request comprises an identifier of a requester of the memory access request and the identifier comprises a Process Address Space identifier (PASID) and wherein the configuration that a redirection operation is permitted to be performed for a memory access request is based at least on the identifier.

Example 11 includes any example, and includes instructions stored thereon, that if executed by one or more processors, cause the one or more processors to: based on a configuration that a redirection operation is not permitted to be performed for a memory access request, cause transmission of the memory access request to a device identified in the memory access request.

Example 12 includes any example, and includes instructions stored thereon, that if executed by one or more processors, cause the one or more processors to: based on a configuration that a redirection operation is permitted to be performed for the memory access request: access a directory of cached content in a memory cache tier to determine whether the target data associated with the memory access request is stored in a different device than that identified in the memory access request.

Example 13 includes any example, wherein the directory of cached content in a memory cache tier comprises at least one entry that indicates whether data associated with an addressable region is stored in a device in the memory cache tier or another memory tier.

Example 14 includes any example, wherein the directory of cached content in a memory cache tier comprises at least one entry that indicates which addressable device stores data associated with an addressable region.

Example 15 includes any example, and includes instructions stored thereon, that if executed by one or more processors, cause the one or more processors to: configure the network device to: copy received target data to a memory cache tier and update a directory of cached content in the memory cache tier to: (a) identify the target data as stored in a device in the memory cache tier and (b) a destination for any data evicted from a device in the memory cache tier.

Example 16 includes any example, and includes a network device apparatus comprising: packet processing circuitry configured to: based on a configuration that a redirection operation is permitted to be performed for a memory access request: determine if target data associated with a memory access request is stored in a different device than that identified in the memory access request and based on the target data associated with the memory access request identified as stored in a different device than that identified in the memory access request, cause transmission of the memory access request to the different device.

Example 17 includes any example, wherein the memory access request comprises an identifier of a requester of the memory access request and the identifier comprises a Process Address Space identifier (PASID) and wherein the configuration that a redirection operation is permitted to be performed for a memory access request is based at least on the identifier.

Example 18 includes any example, wherein the packet processing circuitry is to: based on configuration of a redirection operation not to be performed for the memory access request, cause transmission of the memory access request to a device identified in the memory access request.

Example 19 includes any example, wherein the packet processing circuitry is to: based on a configuration that a redirection operation is permitted to be performed for the memory access request: access a directory of cached content in a memory cache tier to determine whether the target data associated with the memory access request is stored in a different device than that identified in the memory access request.

Example 20 includes any example, and includes one or more of: a switch, router, or network interface card.

What is claimed is:

1. A method comprising:
   in a switch:
      receiving a memory access request from a requester and
      based on a configuration that a redirection operation is permitted, based upon the requester, to be performed for the memory access request:
         determining if target data associated with the memory access request is stored in a different device than that identified in the memory access request and
         based on the target data associated with the memory access request determined to be stored in a different device than that identified in the memory access request, causing transmission of the memory access request to the different device;
      wherein:
         the memory access request is to identify at least one tenant associated with the requester; and
         the redirection operation is to redirect the memory access request to access a latest copy of the target data stored in the different device.

2. The method of claim 1, wherein the memory access request includes an identifier of the requester and the identifier comprises a Process Address Space Identifier (PASID).

3. The method of claim 2, wherein configuration that a redirection operation is permitted to be performed for the memory access request is based at least on the identifier.

4. The method of claim 2, comprising:
   in the switch:
      based on a configuration that a redirection operation is not permitted to be performed for the memory access request, causing transmission of the memory access request to a device identified by the memory access request.

5. The method of claim 1, comprising:
   in the switch:
      based on a configuration that a redirection operation is permitted to be performed for the memory access request:
         accessing a directory of cached content in a memory cache tier to determine whether the target data associated with the memory access request is stored in a different device than that identified in the memory access request, wherein the directory is stored in the switch.

6. The method of claim 5, wherein the directory of cached content in a memory cache tier comprises at least one entry that indicates whether data associated with an addressable region is stored in the memory cache tier or another memory tier.

7. The method of claim 5, wherein the directory of cached content in a memory cache tier comprises at least one entry that indicates which addressable device stores data associated with an addressable region.

8. The method of claim 1, comprising:
   in the switch:
      receiving target data from a device in a non-memory cache tier;
      copying the target data to a device in a memory cache tier; and
      updating a directory of cached content in the memory cache tier to: (a) identify the target data as stored in a device in the memory cache tier and (b) a destination for any data evicted from a device in the memory cache tier.

9. A non-transitory computer-readable medium comprising instructions stored thereon, that if executed by one or more processors, cause the one or more processors to perform operations comprising:
   configure a network device to:
      based on a configuration that a redirection operation is permitted, based upon a requester, to be performed for a memory access request from the requester:
         determine if target data associated with the memory access request is stored in a different device than that identified in the memory access request and
         based on the target data associated with the memory access request identified as stored in a different device than that identified in the memory access request, cause transmission of the memory access request to the different device;
      wherein:
         the memory access request is to identify at least one tenant associated with the requester; and
         the redirection operation is to redirect the memory access request to access a latest copy of the target data stored in the different device.

10. The non-transitory computer-readable medium of claim 9, wherein the memory access request comprises an identifier of the requester of the memory access request and the identifier comprises a Process Address Space Identifier (PASID) and wherein the configuration that a redirection operation is permitted to be performed for a memory access request is based at least on the identifier.

11. The non-transitory computer-readable medium of claim 9, comprising instructions stored thereon, that if executed by one or more processors, cause the one or more processors to:
based on a configuration that a redirection operation is not permitted to be performed for a memory access request, cause transmission of the memory access request to a device identified in the memory access request.

12. The non-transitory computer-readable medium of claim 9, comprising instructions stored thereon, that if executed by one or more processors, cause the one or more processors to:
based on a configuration that a redirection operation is permitted to be performed for the memory access request:
access a directory of cached content in a memory cache tier to determine whether the target data associated with the memory access request is stored in a different device than that identified in the memory access request.

13. The non-transitory computer-readable medium of claim 12, wherein the directory of cached content in a memory cache tier comprises at least one entry that indicates whether data associated with an addressable region is stored in a device in the memory cache tier or another memory tier.

14. The non-transitory computer-readable medium of claim 12, wherein the directory of cached content in a memory cache tier comprises at least one entry that indicates which addressable device stores data associated with an addressable region.

15. The non-transitory computer-readable medium of claim 9, comprising instructions stored thereon, that if executed by one or more processors, cause the one or more processors to:
configure the network device to:
copy received target data to a memory cache tier and
update a directory of cached content in the memory cache tier to: (a) identify the target data as stored in a device in the memory cache tier and (b) a destination for any data evicted from a device in the memory cache tier.

16. A network device apparatus comprising:
packet processing circuitry configured to:
based on a configuration that a redirection operation is permitted, based upon a requester, to be performed for a memory access request from the requester:
determine if target data associated with a memory access request is stored in a different device than that identified in the memory access request and
based on the target data associated with the memory access request identified as stored in a different device than that identified in the memory access request, cause transmission of the memory access request to the different device;
wherein:
the memory access request is to identify at least one tenant associated with the requester; and
the redirection operation is to redirect the memory access request to access a latest copy of the target data stored in the different device.

17. The network device apparatus of claim 16, wherein the memory access request comprises an identifier of the requester of the memory access request and the identifier comprises a Process Address Space Identifier (PASID) and wherein the configuration that a redirection operation is permitted to be performed for a memory access request is based at least on the identifier.

18. The network device apparatus of claim 16, wherein the packet processing circuitry is to:
based on configuration of a redirection operation not to be performed for the memory access request, cause transmission of the memory access request to a device identified in the memory access request.

19. The network device apparatus of claim 16, wherein the packet processing circuitry is to:
based on a configuration that a redirection operation is permitted to be performed for the memory access request:
access a directory of cached content in a memory cache tier to determine whether the target data associated with the memory access request is stored in a different device than that identified in the memory access request.

20. The network device apparatus of claim 16, comprising one or more of: a switch, router, or network interface card.

* * * * *